United States Patent [19]
Moyer

[11] Patent Number: 5,907,865
[45] Date of Patent: May 25, 1999

[54] METHOD AND DATA PROCESSING SYSTEM FOR DYNAMICALLY ACCESSING BOTH BIG-ENDIAN AND LITTLE-ENDIAN STORAGE SCHEMES

[75] Inventor: William C. Moyer, Dripping Springs, Tex.

[73] Assignee: Motorola, Inc., Schaumburg, Ill.

[21] Appl. No.: 08/924,913

[22] Filed: Sep. 8, 1997

Related U.S. Application Data

[63] Continuation of application No. 08/520,064, Aug. 28, 1995, abandoned.

[51] Int. Cl.$^6$ ............................................. G06F 7/00
[52] U.S. Cl. ........................... 711/201; 711/202; 711/211; 395/898; 395/380
[58] Field of Search ................................. 711/201, 202, 711/211; 395/898, 380

[56] References Cited

U.S. PATENT DOCUMENTS

| | | | |
|---|---|---|---|
| 4,447,878 | 5/1984 | Kinnie et al. | 364/200 |
| 5,014,187 | 5/1991 | Debize et al. | 364/200 |
| 5,107,415 | 4/1992 | Sato et al. | 395/800 |
| 5,187,783 | 2/1993 | Mansfield et al. | 395/425 |
| 5,446,482 | 8/1995 | Van Aken et al. | 345/199 |
| 5,519,842 | 5/1996 | Atallah et al. | 711/202 |
| 5,524,256 | 6/1996 | Turkowski | 395/898 |
| 5,572,713 | 11/1996 | Weber et al. | 395/500 |
| 5,574,923 | 11/1996 | Heeb et al. | 395/800.38 |
| 5,627,975 | 5/1997 | Bryant et al. | 395/307 |
| 5,630,084 | 5/1997 | Ikumi | 395/376 |
| 5,655,065 | 8/1997 | Robertson et al. | 395/133 |
| 5,687,337 | 11/1997 | Calneyale et al. | 395/380 |

*Primary Examiner*—Eddie P. Chan
*Assistant Examiner*—Hong Kim
*Attorney, Agent, or Firm*—Keith E. Witek

[57] ABSTRACT

A method and apparatus is used to allow big-endian data and little-endian data to be read from memory in a dynamic manner. A multiplexer controller (18) is provided size bits and two low order address bits A0 and A1 as control signals from a CPU (16). A0 is used by the controller (18) to distinguish between little-endian reads and big-endian reads for both 16-bit halfword accesses and 32-bit word accesses. Using the control signals from the CPU (16), the controller (18) provides ten control signals to a multiplexer 20. One of signals A–D are enabled for byte accesses, one of signals E'–G' are enabled for big-endian halfword or word accesses, and one of the signals E"–G" are enabled for little-endian halfword or word accesses. The multiplexor switches the external data from big-endian or little-endian to a common CPU-internal format while also aligning data reads for byte and halfword accesses in response to the ten control signals.

45 Claims, 5 Drawing Sheets

| TRANSFER SIZE | SIGNAL ENCODING | | | | ACTIVE INTERFACE BUS SECTIONS | | | | MUX CONNECTIONS |
|---|---|---|---|---|---|---|---|---|---|
| | SIZ1 | SIZ0 | A1 | A0 | D31-D24 | D23-D16 | D15-D8 | D7-D0 | |
| BYTE | 0 | 1 | 0 | 0 | -- | — | — | MB0 | A |
| | 0 | 1 | 0 | 1 | — | -- | — | MB1 | B |
| | 0 | 1 | 1 | 0 | — | — | -- | MB2 | C |
| | 0 | 1 | 1 | 1 | — | — | — | MB3 | D |
| HALFWORD | 1 | 0 | 0 | X | -- | -- | MB0 | MB1 | E |
| | 1 | 0 | 1 | X | — | — | MB2 | MB3 | F |
| WORD | 0 | 0 | X | X | MB0 | MB1 | MB2 | MB3 | G |

| TRANSFER SIZE | SIGNAL ENCODING | | | | ACTIVE INTERFACE BUS SECTIONS | | | | MUX CONNECTIONS |
|---|---|---|---|---|---|---|---|---|---|
| | SIZ1 | SIZ0 | A1 | A0 | D31-D24 | D23-D16 | D15-D8 | D7-D0 | |
| BYTE | 0 | 1 | 0 | 0 | -- | — | — | MB0 | A |
| | 0 | 1 | 0 | 1 | — | -- | — | MB1 | B |
| | 0 | 1 | 1 | 0 | — | — | -- | MB2 | C |
| | 0 | 1 | 1 | 1 | — | — | — | MB3 | D |
| HALFWORD | 1 | 0 | 0 | 0 | -- | -- | MB0 | MB1 | E' |
| | 1 | 0 | 1 | 0 | — | — | MB2 | MB3 | F' |
| WORD | 0 | 0 | X | 0 | MB0 | MB1 | MB2 | MB3 | G' |

| TRANSFER SIZE | SIGNAL ENCODING | | | | ACTIVE INTERFACE BUS SECTIONS | | | | MUX CONNECTIONS |
|---|---|---|---|---|---|---|---|---|---|
| | SIZ1 | SIZ0 | A1 | A0 | D31-D24 | D23-D16 | D15-D8 | D7-D0 | |
| BYTE | 0 | 1 | 0 | 0 | -- | — | — | MB0 | A |
| | 0 | 1 | 0 | 1 | — | -- | — | MB1 | B |
| | 0 | 1 | 1 | 0 | — | — | -- | MB2 | C |
| | 0 | 1 | 1 | 1 | — | — | — | MB3 | D |
| HALFWORD | 1 | 0 | 0 | 1 | -- | -- | MB0 | MB1 | E" |
| | 1 | 0 | 1 | 1 | — | — | MB2 | MB3 | F" |
| WORD | 0 | 0 | X | 1 | MB0 | MB1 | MB2 | MB3 | G" |

METHOD AND DATA PROCESSING SYSTEM FOR DYNAMICALLY ACCESSING BOTH BIG-ENDIAN AND LITTLE-ENDIAN STORAGE SCHEMES

This application is a continuation of prior patent application Ser. No. 08/520,064 filed Aug. 28, 1995 now abandoned.

FIELD OF THE INVENTION

The present invention relates generally to data processing systems, and more particularly, to reading big-endian stored data and little-endian stored data stored from memory in a dynamic manner.

BACKGROUND OF THE INVENTION

Microprocessors read and write binary values to and from memory in order to read data and execute computer software. Throughout the last several years of microprocessor design, two primary memory formats have been used to store binary information in external or internal memory. Processors using different formats have typically been incompatible with one another. One commonly-used data storage format is illustrated in FIG. 1 and is referred to as a big-endian format. A second commonly-used format is illustrated in FIG. 2 and is referred to as a little-endian format.

In FIG. 1, four byte memory locations are illustrated. The four memory locations may be used to store four bytes of information referred to as byte 0, byte 1, byte 2, and byte 3. In another form, the four storage locations in FIG. 1 may be used to store a halfword 0 and a halfword 1. Each halfword is a 16-bit value that comprises two bytes. In addition, the four storage locations in FIG. 1 may be used to store a word of data which is a 32-bit value. Therefore, the storage locations in FIG. 1 allow byte, halfword, and word storage of data. In another lingual convention used primarily for 16-bit bus machines, halfwords are referred to as 16-bit "words" and the 32-bit word in FIG. 1 is referred to as a "longword."

Byte storage does not vary significantly between a big-endian format and a little-endian format. Big-endian and little-endian, however, differ extensively when halfwords and words are stored. Referring to FIG. 1, halfword 0 is stored in two byte locations referred to as byte 0 and byte 1. Byte 0 is a most significant portion of the halfword and byte 1 is a least significant portion of the halfword. Byte 0 stores the value 12 in hexadecimal and byte 1 0 stores the value 34 in hexadecimal. Therefore, halfword 0 will be read from FIG. 1 as being a hexadecimal value 1234. In a similar manner, halfword 2 will be read from memory, having a most significant byte 56 and a least significant byte 78 so that halfword 1 stores the hexadecimal value 5678.

In FIG. 1, the byte 0 will have an address value less than byte 1, byte 1 will have an address value less than byte 2, and byte 2 will have an address value less than byte 3. For example, if byte 0 was located in memory such that byte 0 has an address of 50 hexadecimal, byte 1 will have an address of 51 hexadecimal, byte 2 will have an address of 52 hexadecimal, and byte 3 will have an address of 53 hexadecimal. Therefore, for example, byte 3 is referred to as residing in a higher address space than bytes 0, 1 or 2. Therefore, when reading halfwords or words from memory, most significant bytes in the big-endian format are stored in low address space whereas least significant byte portions are stored in a higher address space than the most significant bit portions.

When a 32-bit word is stored in FIG. 1, the value read will be 12345678 hexadecimal due to the fact that Byte 0 is a most significant byte and Byte 3 is a least significant byte.

FIG. 2 illustrates the little-endian data format. Halfword 0 of FIG. 2 will be read from memory as having a value of 5678. This is because, when using little-endian data storage format, most significant bytes are stored in a higher address space than least significant bytes. This little-endian format is the reverse of the big-endian format. Therefore, halfword 1 will be read as a value 1234. If a 32-bit word value referred to as word 0 is read from memory in FIG. 2, this word will have a hexadecimal value of 12345678.

In summary, if a 32-bit word is read from FIG. 1, that 32-bit value would be hexadecimal 12345678. Also, if a 32-bit word is read from FIG. 2 using the little-endian format, the hexadecimal value 12345678 is read. However, as one can easily see from FIGS. 1 and 2, even though both reads result in the same value, the individual bytes of FIG. 1 and FIG. 2 are reversed when compared to each other. This inherent reversal of byte order between the big-endian format and the little-endian format results in problems when a microprocessor must read both a big-endian format and a little-endian format.

One way in which the prior art has tried to read both the big-endian and the little-endian formats in memory has been to provide a special status bit internal to a CPU which identifies which type of data format is being accessed with each read instruction. This bit must be toggled every time the format of the data in memory changes. Using this technique, if a CPU is required to read a big-endian data value followed by a little-endian data value, these two reads would require at least four instructions. A first instruction that is a write instruction would be used to set the internal status bit to a value which allowed big-endian reads. A second instruction that is a read instruction would perform the big-endian read. A third instruction that is a write instruction would be used to change the internal status bit to indicate a little-endian read. Finally, a fourth instruction that is a read instruction would be used to actually read the little-endian data from memory.

Therefore, at least four instructions are needed to read two conflicting data formats stored consecutively in memory when using this status bit methodology.

In another form, a first opcode may be used to perform little endian operations and a second opcode may be used to perform big endian operations. This method involves more complicated instruction decode circuitry and is limiting since a programmer may not know which type of data is being accessed. In addition, code written for one data-type cannot be easily switched to another database.

A new method for reading both big-endian and little-endian formats from memory is needed in order to improve the performance of CPUs which are required to access both the big-endian format and the little-endian format.

DESCRIPTION OF A PREFERRED EMBODIMENT

Generally, the present invention involves a novel multiplexor and multiplexing method which allows both big-endian values and little-endian values to be read from memory in an efficient and dynamic manner. This method and multiplexer does not require additional instructions to be executed as does the status bit method discussed in the background herein. Since no status bit write instructions are needed to change data format, performance is improved.

In general, control circuitry for the multiplexor receives at least one control signal which indicates a size of the value to be read from memory. In a preferred embodiment, two size control values are provided to the multiplexor control unit to identify one of either a byte access, a 16-bit halfword access, or a 32-bit word access. In addition to the two size control values, two address bits are provided to the multiplexor controller. In a preferred form, these two address bits are the least significant bits of the address and are referred to as A0 and A1 for an address bus denoted as A31:A0. For byte accesses, little-endian and big-endian distinctions are not needed and therefore the A1 value is used for addressing purposes. When performing reads of halfwords and words, the address bit A0 is not needed for addressing when halfwords and words are forced by the CPU architecture to begin consistently at one of either even or odd addresses. When using this architecture, referred to as an aligned architecture, halfword and word accesses will internally assume an A0 value of 1 for odd address alignment and 0 for even address alignment thereby freeing up the address line A0 for use in identifying the storage format (either big-endian or little-endian).

The address bits and size bits are decoded to produce control signals which are provided to the multiplexor where in the address bit A0 determines whether a little-endian or big-endian format is to be read. Since this address bit A0 is provided dynamically along with the read or write instruction to memory, no additional instructions are needed to set the data format mode. Therefore, the value of the little-endian or big-endian data can be read from memory, translated through the multiplexor properly, and provided to the data processor efficiently without any overhead of additional instructions or data format control signals.

The invention can be further understood by discussing FIGS. 3–9 in detail.

Figures 3, 4:
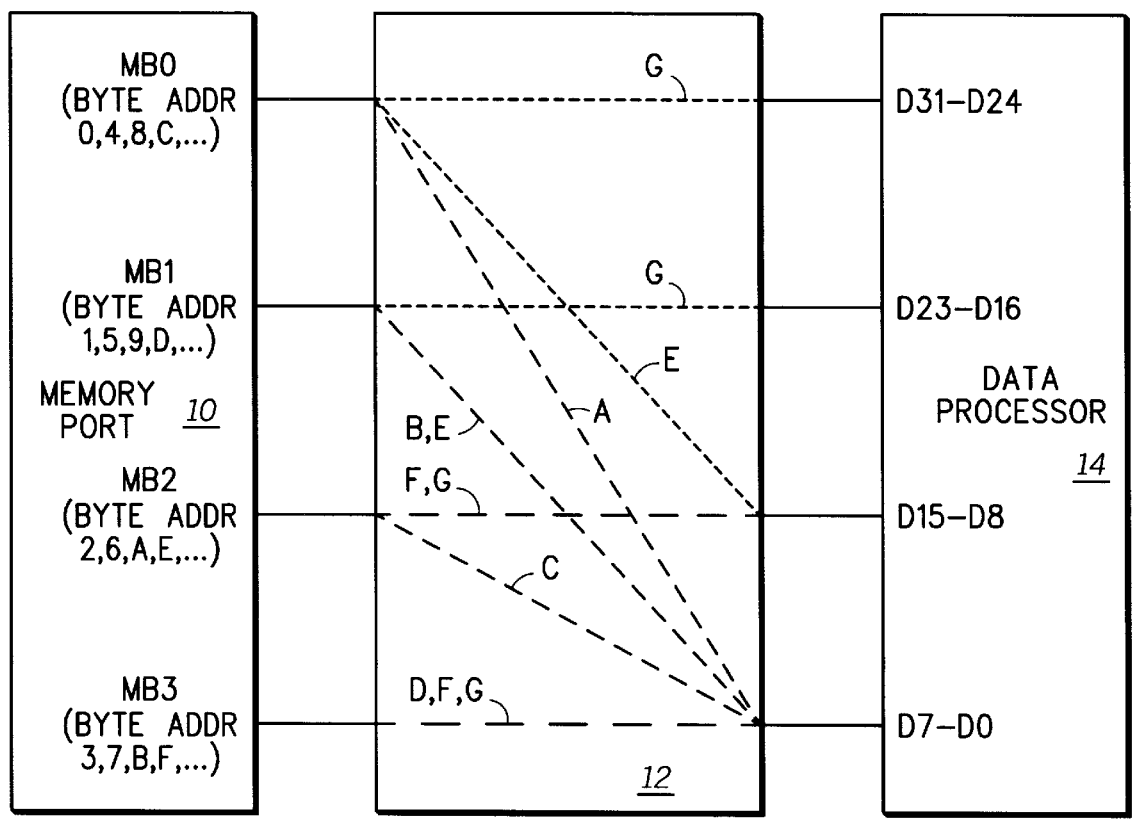
FIG. 3 illustrates a table which identifies decoding, control signals, and switching that is needed to switch big-endian data to an internal common CPU data format in accordance with the present invention.
FIG. 4 illustrates, in a block diagram, the switching needed to switch big-endian data to an internal common CPU data format in accordance with FIG. 3.

FIG. 3 illustrates a table which indicates how byte, 16-bit halfword and 32-bit word read operations are performed from memory when only a big-endian data format is used in external memory. FIG. 3 illustrates the size 1 (SIZ1) and size 0 (SIZ0) bits which are provided to the multiplexor controller from the CPU opcode decoding circuitry and illustrates the address bits A1 and A0 which are also provided to the multiplexor controller via the CPU. FIG. 3 has four columns labeled as active interface bus sections. The four columns of the active interface bus section indicate four byte outputs from the multiplexor. The column labeled D7-D0 is the portion of the internal CPU data bus that contains the least significant byte in the read operation. D31-D24 is a column that contains the most significant byte of the internal data bus of the microprocessor.

As illustrated in FIG. 3, byte reads only require a single byte portion of the internal data bus. The bus portion required for the byte read is only the least significant D7-D0 portion of the internal bus (8 bits of the internal bus are used for a byte read). Therefore, regardless of byte location in memory, only the least significant byte portion of the internal processor data bus carries data when byte reads are performed. In other words, a byte read is provided out from a memory at any one of the 8-bit port MB0, MB1, MB2, MB3, depending upon their address value (See FIG. 4). However, all of these ports MB0, MB1, MB2, MB3 are coupled to D7-D0 through the multiplexer for byte memory reads.

When a halfword is read from memory 10, two internal byte portions of the internal data bus are required in order to communicate a 16-bit halfword value. These two byte data bus portions are D7-D0 and D15-D8 for halfword reads. When a word of data is read from memory, the entire 32 bits of the internal data bus D31-D0 are required to transfer 32-bits of data from memory to the CPU.

FIG. 4 illustrates in a block diagram the connections required in order to allow the switching illustrated in FIG. 3. FIG. 3 illustrates a memory element 10 coupled through a multiplexor 12 to a data processor 14. In a preferred embodiment, the multiplexor 12 is on-chip with the processor 14. However, in another form, the multiplexor 12 may be a switching device external to the package of the processor 14, or in yet another form, the multiplexor 12 may be a multiplexor provided on chip with the memory 10. The multiplexor 12 of FIG. 4 is illustrative of both multiplexor control and multiplexor switching circuitry that is coupled to the multiplexor control.

Figure 1:
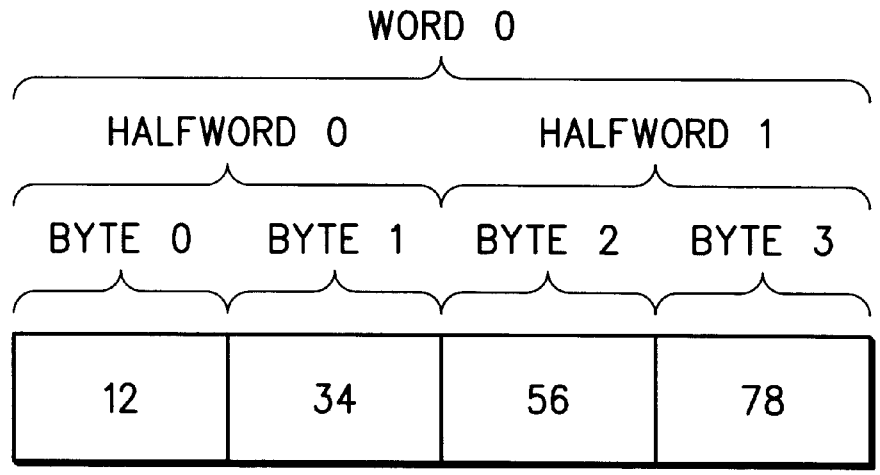
FIG. 1 illustrates, in a block diagram, a prior art convention for storing data in a big-endian format.

When the byte 0 of FIG. 1 is read using the structure of FIG. 4, byte 0 is provided from the memory 10 via the MB0 port. The MB1, MB2, and MB3 ports of the memory 10 will contain information that is not needed by the processor 14. The byte 0 of FIG. 1 that is provided on the MB0 port of memory 10 in FIG. 4 needs to be shifted from the MB0 output of the memory 10 to the D7-0 input of the processor 14 via the multiplexor 12. Therefore, the multiplexor control uses the SIZ1, SIZ0, A1, and A0 signals to provide a control signal A as illustrated in FIG. 3. Control signal A, illustrated in the table of FIG. 3, is provided to the multiplexor to provide for the path A in FIG. 4. Therefore, the MUX connections in FIG. 3 and the paths in FIG. 4 labeled as A–G may be referred to as control signals or as enabled paths. In summary, the data 12 read from FIG. 1, where FIG. 1 is resident in memory 10, is switched from the MB0 port to the D7-0 input of the processor 14 via multiplexer 12.

In a similar manner, when byte 1 of FIG. 1 is read into the data processor 14, the multiplexor will connect the MB1 output of memory 10 to the D7-0 input of the processor 14 via a control signal B illustrated in FIGS. 3 and 4. When reading the byte 2 from FIG. 1, the multiplexor 12 will couple the MB2 output of memory to the multiplexor 12 to the D7-0 input of the processor 14 via the assertion of a control signal C. When reading byte 3 from memory in FIG. 1, the MB3 output of the memory 12 is coupled to the D7-0 input of the processor 14 via a control signal D. Given the table of FIG. 3, decoding of the control signals A–D is trivial since the values of size 1, size 0, A1, and A0 of FIG. 3 are clearly identified for each access type.

Two types of halfword reads are indicated in the table of FIG. 3. These two halfword reads correspond to the two halfwords illustrated in FIG. 1. The A0 control line in FIG. 3 is a don't care 'X' for purposes of halfword reads. This means that halfword reads can only be performed in an aligned manner. Therefore, a halfword 0 can be read which contains byte 0 and byte 1 as illustrated in FIG. 1, or a halfword 1 can be read from memory which contains a byte 2 and byte 3 as illustrated in FIG. 1. However, since A0 is a don't care 'X' condition, no halfword can be read that contains both byte 1 and byte 2. Since A0 is a don't care for halfword reads, misaligning halfword reads are not possible in this system illustrated in FIG. 4.

When the halfword 0 of FIG. 1 is read from the memory 10, MB0 of FIG. 4 is connected to D15-8 in FIG. 4 while MB1 is connected to D7-0 via a control signal E. This allows the value of the halfword 1 of FIG. 1 to be switched to the byte input D7-0 and byte input D15-8 of the processor 14 in a proper big-endian manner. In addition, when accessing the halfword 1 of FIG. 1 MB2 is coupled to D15-8 in FIG. 4, while MB3 is coupled to D7-0 in FIG. 4. The reading of halfword 0 from memory is enabled via a control signal E and reading of a halfword 1 from memory 10 is enable via a control signal F provided as illustrated in FIG. 3.

When reading the 32-bit word 0 from FIG. 1, the control logic within the multiplexor asserts a control signal G which allows the 32-bit output from the memory 10 to be connected directly to the 32-bit D31-D0 of the internal data bus of the processor 14. Therefore, when performing a 32-bit big-endian read, MB0 is coupled to D31-24, MB1 is coupled to D23-16, MB2 is coupled to D15-8, and MB3 is coupled to D7-0 as illustrated in FIG. 4.

Figures 5, 6:
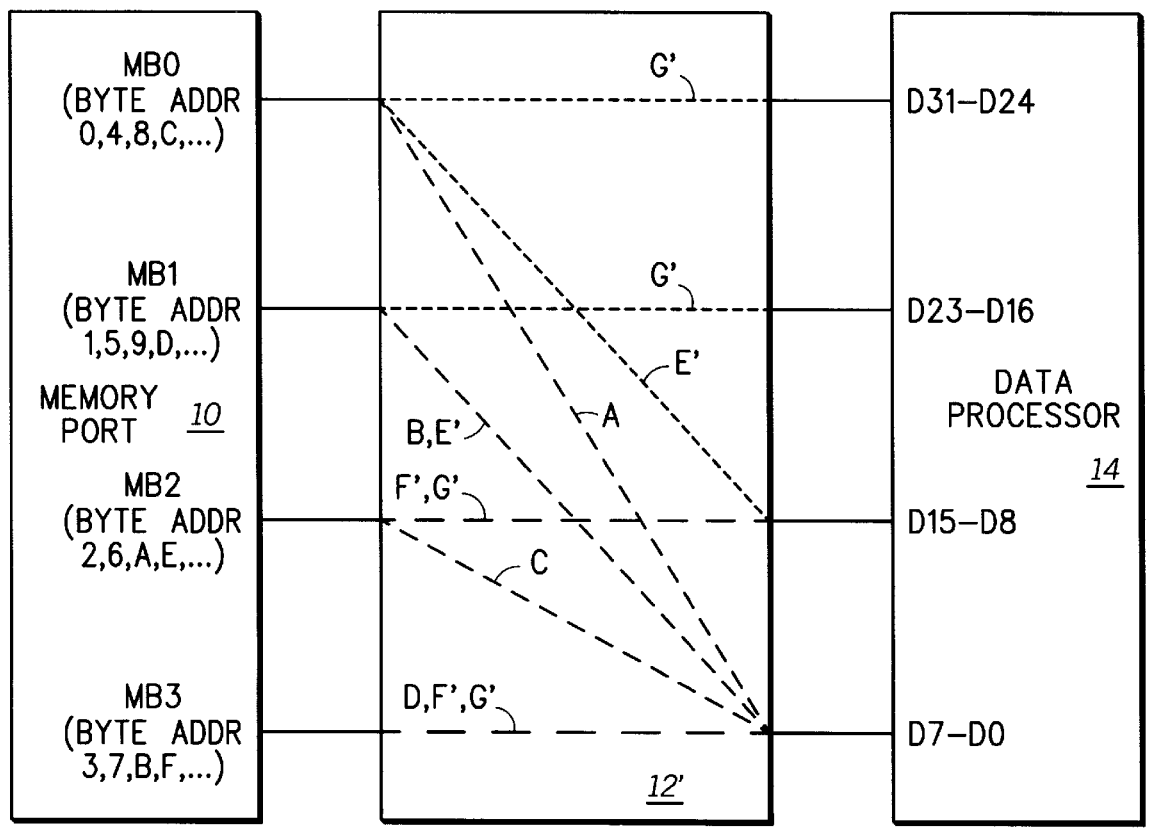
FIG. 5 illustrates a table which identifies another set of decoding values, control signals, and switching that is needed to convert big-endian data to an internal common CPU data format in accordance with the present invention.
FIG. 6 illustrates, in a block diagram, the switching needed to switch big-endian data to an internal common CPU data format in accordance with FIG. 5.

FIGS. 5 and 6 illustrate how the address bit A0 of FIG. 3 can be changed from a don't care 'X' to a control signal to allow for the dynamic identification of big-endian reads from little-endian reads via A0. FIGS. 5 and 6 are identical to FIGS. 3 and 4 with some small but significant changes. In FIG. 5, the A0 bit is used as an active low control bit for halfword and word reads, whereas the A0 bit was a don't care condition in FIG. 3. In FIG. 3, the control signals E, F, and G are asserted by ignoring any logical value on the control signal A0 due to the don't care status of A0 in FIG. 3. However, in FIG. 5, the control signals E', F', and G' are asserted only when A0 is an active low or logic 0. The connections of FIG. 6 are identical to the connections of FIG. 4 with the exception that E is replaced with E', F is replaced with F', and G is replaced with G'. Therefore, in FIG. 6, the control signals E', F' and G' are asserted only when 16-bit halfword or 32-bit word reads are performed and the control bit A0 is a logic 0. Also, the multiplexer of FIG. 6 is labeled as multiplexor 12' since the control signals are slightly different. In summary, A0=0 is effectively used via FIGS. 5–6 to identify a big-endian format when performing a read operation.

Figures 7, 8:
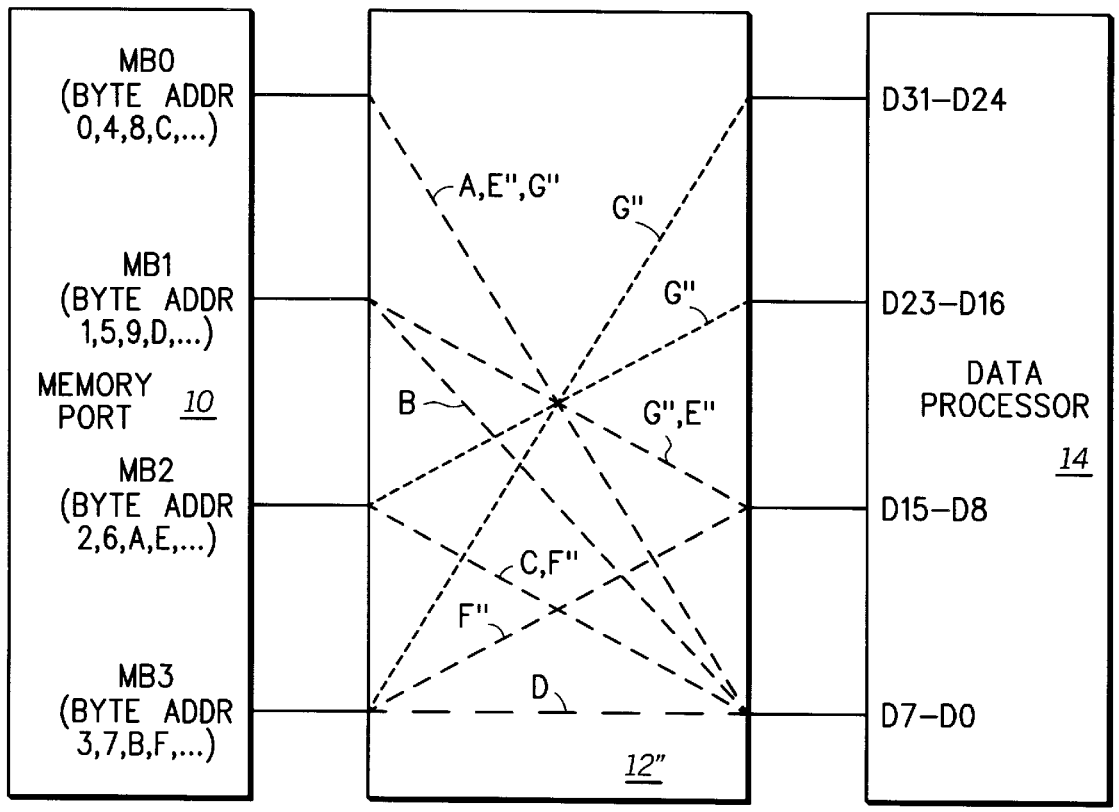
FIG. 7 illustrates a table which identifies decoding values, control signals, and switching that is needed to convert little-endian data to an internal common CPU data format in accordance with the present invention.
FIG. 8 illustrates, in a block diagram, the switching needed to switch little-endian data to an internal common CPU data format in accordance with FIG. 7.

FIGS. 7 and 8 illustrate a set of control signals and interconnections used to read little-endian values from memory. When reading a byte of data from memory in big-endian or little-endian format, no special processing is required by the multiplexor 12. Therefore, a little-endian byte read and a big-endian byte read are handled in FIG. 6 and FIG. 8 in an identical manner. In other words, the control signals A, B, C, and D in FIGS. 5 and 6 are identical to the control signals A, B, C and D in FIGS. 7 and 8, and these control signals A, B, C, and D are independent of whether little-endian values are being read or big-endian values are being read. However, the halfword and word reads of little-endian FIG. 7 require that the address bit A0 be a logic 1. Therefore, when comparing FIG. 5 to FIG. 7, the logical value of the A0 bit is used to determine whether a little-endian halfword or word read is occurring or a big-endian halfword or word read is occurring. If a big-endian read is occurring for a halfword or word, then one of E', F' or G' is asserted via A0=0. If a little-endian halfword or word read is occurring, then control signals E", F", or G" are asserted in accordance with FIG. 7 via A0=1.

In FIG. 8, the byte read connections are identical to FIG. 6 and FIG. 4. Therefore, byte reads for little-endian and big-endian values are controlled by the same control signals A, B, C, and D as illustrated in FIGS. 3–8.

Figure 2:
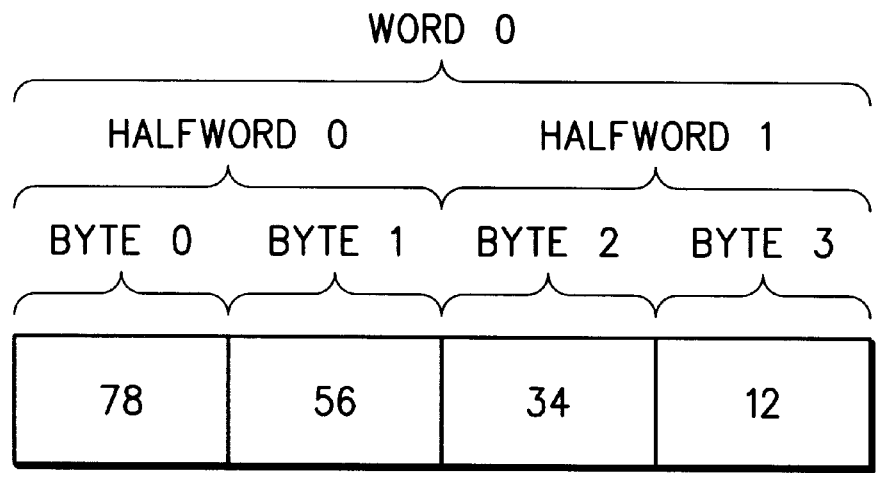
FIG. 2 illustrates, in a block diagram, a prior art convention for storing data in a little-endian format.

When reading halfword 0 from FIG. 2 wherein FIG. 2 is resident within memory 10, multiplexor 12" of FIG. 8 couples MB0 to D7-0 in FIG. 8 and couples MB1 to D15-8 in FIG. 8 via a control signal E". When reading the little-endian halfword 1 of FIG. 2 wherein FIG. 2 is resident within memory 10, the multiplexor 12" of FIG. 8 couples MB2 to D7-0 and MB3 to D15-8 via a control signal F". When reading the 32-bit word 0 from FIG. 2 in the little-endian format, MB0 is coupled to D7-0, MB1 is coupled to D15-8, MB2 is coupled to D23-16, and MB3 is coupled to D31-24 via a control signal G".

It is important to note that the connections made by FIG. 6 and FIG. 8 may be performed by the same multiplexor as long as the multiplexor is provided with the control signals A, B, C, D, E', F', G', E", F", and G". In other words, multiplexor 12' and multiplexor 12" are implemented in a single multiplexor performing all of the connections illustrated in FIGS. 6 and 8. The logic and coding of these ten control signals A, B, C, D, E', F', G', E", F", and G" is clearly taught via FIGS. 5 and 7 and are a function of the values of SIZ1, SIZ0, A1, and A0.

By using the bit A0 to determine a little-endian or big-endian read of halfword or word values, an additional instruction to set up a status bit inside the CPU is not required as discussed in the background. Therefore, a big-endian value and a little-endian value may be consecutively read from memory with two instructions instead of four instructions since the A0 and A1 values of the read operations can be dynamically set by the processor when performing the read instructions.

Figure 9:
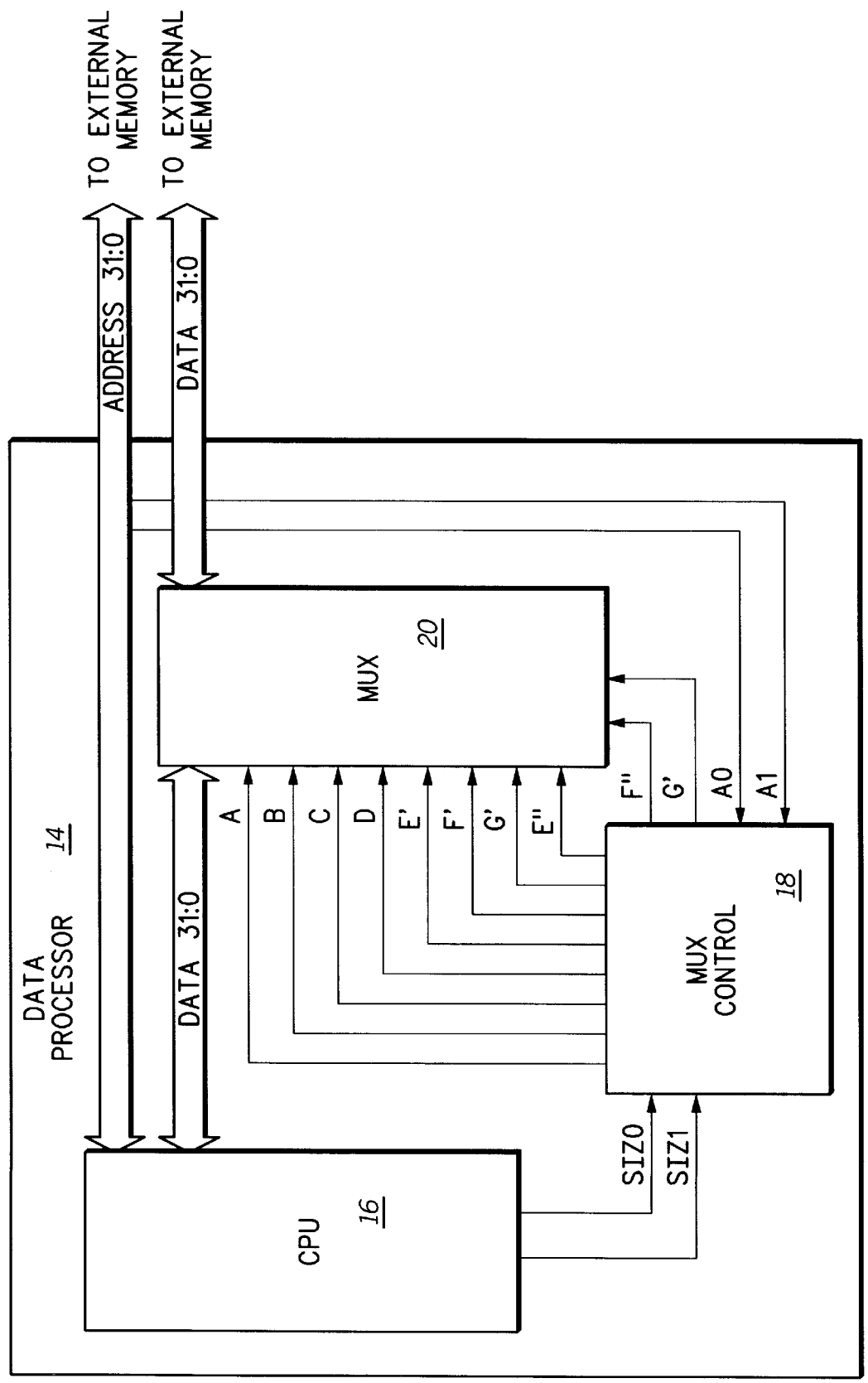
FIG. 9 illustrates, in a block diagram, a system which combines the switching of FIGS. 6 and 8 into one multiplexor that allows both little-endian and big-endian reads in accordance with the present invention.

FIG. 9 illustrates a data processor 14 having a CPU 16, a multiplexor controller 18, and the multiplexor (MUX) 20. The MUX 20 is the combination of the switching indicated in FIG. 8 and the switching indicated in FIG. 6 so that both little-endian and big-endian values may be read from an external memory. FIG. 9 illustrates a 32-bit address bus and a 32-bit data bus. The 32-bit address bus and the 32-bit data bus interface to external memory as illustrated in FIG. 9. The two size bits, labeled SIZ1 and SIZ0 are provided from the CPU 16 to the multiplexor controller 18 in FIG. 9. The size bits are determined when decoding the instruction stream within the CPU 16. When decoding an instruction, the decoding will provide information that allows the CPU to determine whether a byte, a word, or a halfword is to be accessed from memory 10. This information is then translated into the SIZ1 and SIZ0 bits which are provided to the multiplexor control 18 in FIG. 9.

In addition, the multiplexor controller 18 receives as input the address bits A0 and A1. In accordance with FIGS. 5 and 7, the multiplexor controller provides the control signals A, B, C, D, E', F', G', E", F", and G" to the multiplexor 20. The multiplexor 20, in response to one of the ten input control signals, switches the input data from external memory to a common format that the CPU 16 can use internally. The switching performed by the multiplexor is also in accordance with the switching taught via FIG. 6 and FIG. 8.

While the present invention has been illustrated and described with reference to specific embodiments, further modifications and improvements will occur to those skilled in the art. For example, other bus sizes may be used such as 24-bit buses or 64-bit buses. Other address bits besides the bit A0 may be used to identify which type of data access, either little-endian or big-endian, is performed. The multiplexor 20 of FIG. 9 may be further designed using additional control signals to accommodate other date formats other than little-endian or big-endian. A multiplexor similar to multiplexor 20 may be used for writes of data from the CPU 16 to external memory so that both big-endian data and little-endian data can be written and read from the CPU 16. Also, the internal data bus D31-D0 of FIG. 4, 6, and 8 is illustrated as being big-endian in nature. In other words, FIGS. 3–8 indicate that data is converted from a big-endian or little-endian form in memory to an aligned big-endian form internal to the CPU 14. However, one could easily make the internal CPU 14 format little-endian as well as big-endian. It is to be understood therefore that this invention is not limited to the particular embodiments illustrated, and that it is intended in the appended claims to cover all modifications that do not depart from the spirit and scope of this invention.

What is claimed is:

1. A method for reading a data value from a memory device, the data value having at least two bytes of data wherein one byte of the at least two bytes is a most significant byte of the data value and a second byte in the at least two bytes is a least significant byte of the data value, the method comprising the steps of:

providing an address value wherein a first portion of the address value indicates a beginning memory location where the data value is stored in the memory device, and wherein a second portion of the address value is a selection bit;

providing the selection bit of the address value to a switching device wherein the switching device receives the at least two bytes of data from the memory device and provides at least two bytes of data as output wherein the at least two bytes of data which are provided as output are ordered in response to a logic state of the selection bit, the at least two bytes of data being provided to the switching device in response to the step of providing the address value;

providing at least one size value to the switching device along with the selection bit of the address value in order to determine how many bytes of the at least two bytes of data provided as output bytes;

ordering the at least two bytes of data through the switching device in a little-endian manner in response to a first state of the selection bit and the at least one size value; and ordering the at least two bytes of data through the switching device in a big-endian manner in response to a second state of the selection bit and the at least one size value.

2. The method of claim 1 wherein the switching device has a first input, a second input, a third input, a fourth input, a first output, a second output, a third output, and a fourth output wherein each input and each output of the switching device comprises eight bit lines to conduct a byte of data, the first output being least significant data bits and the fourth output being most significant data bits.

3. The method of claim 2 wherein the switching device allows for the reading of a byte of data from memory wherein the byte of data is provided to any one of the first, second, third, or fourth inputs and is shifted to the first output.

4. The method of claim 2 wherein the switching device allows for the reading of a halfword of data from memory wherein the halfword of data is provided to the first input and the second input where the switching device connects the first input to the first output and the second input to the second output when the halfword is in a big-endian format.

5. The method of claim 2 wherein the switching device allows for the reading of a halfword of data from memory wherein the halfword of data is provided to the third input and the fourth input where the switching device connects the third input to the first output and the fourth input to the second output when the halfword is in a big-endian format.

6. The method of claim 2 wherein the switching device allows for the reading of a halfword of data from memory wherein the halfword of data is provided to the first input and the second input where the switching device connects the first input to the second output and the second input to the first output when the halfword is in a little-endian format.

7. The method of claim 2 wherein the switching device allows for the reading of a halfword of data from memory wherein the halfword of data is provided to the third input and the fourth input where the switching device connects the third input to the second output and the fourth input to the first output when the halfword is in a little-endian format.

8. The method of claim 2 wherein the switching device allows for the reading of a 32-bit word of data from memory wherein the 32-bit word of data is provided to the first through fourth inputs where the switching device connects the first input to the fourth output, the second input to the third output, the third input to the second output, and the fourth input to the first output when the 32-bit word of data is in a little-endian format.

9. The method of claim 2 wherein the switching device allows for the reading of a 32-bit word of data from memory wherein the 32-bit word of data is provided to the first through fourth inputs where the switching device connects the fourth input to the fourth output, the third input to the third output, the second input to the second output, and the first input to the first output when the 32-bit word of data is in a big-endian format.

10. The method of claim 2 wherein the selection bit is ignored for addressing purposes when either a halfword or a word is accessed by the address value, whereas the selection bit is being used for identifying whether the data value is stored in a little-endian format or a big-endian format.

11. The method of claim 1 wherein the at least two bytes of data form a data value selected from a group consisting of: a 16-bit half word value, a 32-bit word value, and a 64-bit data value, wherein the data value is stored in one of either a little-endian manner or a big-endian manner.

12. The method of claim 2 wherein the selection bit is a least significant bit of the address value.

13. A method for reading a data value from memory wherein the data value contains a plurality of data bytes stored in a plurality of memory locations in the memory wherein the plurality of memory locations progress from a low address to a high address, the method comprising the steps of:

(a) providing an address value to the memory;

(b) providing a plurality of control signals to a switching device wherein a portion of the plurality of control signals are low order address bits from the address value;

(c) communicating the plurality of data bytes from the memory to the switching device in response to the address value;

(d) ordering, in response to a first state of the low order address bits from the address value, the plurality of data bytes through the switching device to a central processing unit (CPU) in a manner such that: (1) a data byte in the plurality of data bytes that is stored in the low address of memory is switched to a low byte portion of a data bus internal to CPU; and (2) a data byte in the plurality of data bytes that is stored in the high address of memory is switched to a high byte portion of a data bus internal to CPU; and (e) ordering, in response to a second state of the low order address bits from the address value, the plurality of data bytes through the switching device to the central processing unit (CPU) in a manner such that: (1) a data byte in the plurality of data bytes that is stored in the low address of memory is switched to the high byte portion of a data bus internal to CPU; and (2) a data byte in the plurality of data bytes that is stored in the high address of memory is switched to the low byte portion of a data bus internal to CPU, wherein the steps (d) and (e) allow either a big-endian value to be read as the data value or a little-endian value to be read as the data value.

14. The method of claim 12 wherein both big-endian data values and little-endian data values are stored consecutively in the memory and read sequentially from the memory via two executions of steps (a) through (e).

15. The method of claim 14 wherein both big-endian data values and little-endian data values are translated via steps (d) and (e) dynamically so that one big-endian value and one little-endian value are read sequentially from memory in two or fewer CPU clock cycles.

16. The method of claim 13 wherein the control signal is an address bit of the address value.

17. The method of claim 16 wherein the control signal is a least significant address bit of the address value and at least one size bit provided from a decoder unit within the CPU.

18. The method of claim 13 wherein the steps (a) through (e) allow for big-endian and little-endian reads of 16-bit halfwords.

19. The method of claim 18 wherein the switching device has a first input, a second input, a third input, and a fourth input wherein the first input corresponds to a lower address space than the second input, the second input corresponds to a lower address space than the third input and the third input corresponds to a lower address space than the fourth input.

20. The method of claim 19 wherein a 16-bit halfword are provided to either the first and second inputs or the third and fourth inputs.

21. The method of claim 19 wherein two 16-bit halfwords are provided in parallel to both: (1) the first and second inputs; and (2) the third and fourth inputs.

22. The method of claim 13 wherein the control signal comprises a plurality of control signals that identify the size of data value to be read and contains at least two least significant address bits from the address value.

23. The method of claim 13 wherein the control signal comprises ten control signals wherein: (1) four of the ten control signals indicate byte reads for both big-endian and little-endian formats; (2) two of the ten control signals indicate halfword reads for little-endian formats; (3) two of the ten control signals indicate halfword reads for big-endian formats; (4) one of the ten control signals indicates a read for a little-endian 32-bit word; and (5) one of the ten control signals indicates a read for a big-endian 32-bit word.

24. A method for reading a plurality of data values from memory, the method comprising the steps of:

providing a first data value in memory, the first data value being stored in memory in a first data format wherein the first data format is one of either a little-endian format or a big-endian format;

providing a second data value in memory, the second data value being stored in memory in a second data format wherein the second data format is one of either a little-endian format or a big-endian format and is different from the first data format;

providing a third data value in memory, the third data value being stored in memory in the first data format;

providing a first address to the memory, the first address identifying that the first data value is to be accessed;

reading the first data value from the memory and translating the first data value from the first data format to a common data format by performing byte reordering through a switching device as a function of a logic state of a selection bit which is provided as a portion of the first address;

providing a second address to the memory, the second address identifying that the second data value is to be accessed;

reading the second data value from the memory and translating the second data value from the second data format to the common data format by performing byte reordering through a switching device as a function of a logic state of a selection bit which is provided as a portion of the second address;

providing a third address to the memory, the third address identifying that the third data value is to be accessed; and reading the third data value from the memory and translating the third data value from the first data format to the common data format by performing byte reordering through a switching device as a function of a logic state of a selection bit which is provided as a portion of the third address.

25. A method for reading a data value from memory, the method comprising the steps of:

providing the data value from memory to at least one of a first byte input, a second byte input, a third byte input, and a fourth byte input to a central processing unit (CPU) in response to an address value, the first through fourth byte inputs being provided to a multiplexer circuit;

providing at least one data value size control signal and at least one address data bit of the address value to a control circuit to generate a plurality of control signals from the at least one data value size control signal and the at least one address data bit from the address value to control a byte output order;

providing the plurality of control signals to the multiplexer circuit, the multiplexer circuit having a first byte output a second byte output, a third byte output, and a fourth byte output wherein the plurality of control signals are a function of the at least one address bit and are used to control byte output order; and transferring the data value from the first through fourth byte inputs to the first through fourth byte outputs in a first manner when the data value is stored in a little-endian format and transferring the data value from the first through fourth byte inputs to the first through fourth byte outputs in a second manner when the data value is stored in a little-endian format, the first and second manner of byte ordering being determined by a lowest order bit of the address value since the plurality of control signals are a function of the lowest order bit of the address value.

26. The method of claim 25 wherein the step of transferring comprises a step of providing a data value as a byte data value via the first byte input and connecting the first byte input to the first byte output via the multiplexer circuit to transfer the byte data value from the first byte input to the first byte output.

27. The method of claim 25 wherein the step of transferring comprises a step of providing a data value as a byte data value via the second byte input and connecting the second byte input to the first byte output via the multiplexer circuit to transfer the byte data value from the second byte input to the first byte output.

28. The method of claim 25 wherein the step of transferring comprises a step of providing a data value as a byte data value via the third byte input and connecting the third byte input to the first byte output via the multiplexer circuit to transfer the byte data value from the third byte input to the first byte output.

29. The method of claim 25 wherein the step of transferring comprises a step of providing a data value as a byte data value via the fourth byte input and connecting the fourth byte input to the first byte output via the multiplexer circuit to transfer the byte data value from the fourth byte input to the first byte output.

30. The method of claim 25 wherein the step of transferring comprises a step of providing a data value as a 16-bit halfword data value via the first and second byte inputs and connecting the first byte input to the second byte output and the second byte input to the first byte output via the multiplexer circuit when the 16-bit halfword data value is in a little-endian format.

31. The method of claim 25 wherein the step of transferring comprises a step of providing a data value as a 16-bit halfword data value via the third and fourth byte inputs and connecting the third byte input to the second byte output and the fourth byte input to the first byte output via the multiplexer circuit when the 16-bit halfword data value is in a little-endian format.

32. The method of claim 25 wherein the step of transferring comprises a step of providing a data value as a 16-bit halfword data value via the first and second byte inputs and connecting the first byte input to the first byte output and the second byte input to the second byte output via the multiplexer circuit when the 16-bit halfword data value is in a big-endian format.

33. The method of claim 25 wherein the step of transferring comprises a step of providing a data value as a 16-bit halfword data value via the third and fourth byte inputs and connecting the third byte input to the first byte output and the fourth byte input to the second byte output via the multiplexer circuit when the 16-bit halfword data value is in a big-endian format.

34. The method of claim 25 wherein the step of transferring comprises a step of providing a data value as a 32-bit word data value via the first through fourth byte inputs and connecting the first byte input to the first byte output, the second byte input to the second byte output, the third byte input to the third byte output, and the fourth byte input to the fourth byte output via the multiplexer circuit when the 32-bit word data value is in a big-endian format.

35. The method of claim 25 wherein the step of transferring comprises a step of providing a data value as a 32-bit word data value via the first through fourth byte inputs and connecting the first byte input to the fourth byte output, the second byte input to the third byte output, the third byte input to the second byte output, and the fourth byte input to the first byte output via the multiplexer circuit when the 32-bit word data value is in a little-endian format.

36. A data processing system comprising:
a central processing unit (CPU);
a plurality of input terminals to an integrated circuit;
a switching circuit having inputs coupled to the plurality of input terminals, the switching circuit having a plurality of outputs coupled to the CPU; and
a control circuit receiving at least two lowest order address bits and data size bits from the CPU and providing a plurality of control signals to the switching circuit wherein the plurality of control signals allow the switching circuit to reorder bytes in order to read little-endian data values and big-endian data values from external memory where little-endian data values are reordered by a first logic state provided via a low order address bit from the CPU and big-endian data values are reordered by a second logic state provided via a low order address bit from the CPU.

37. A method for writing a data value to a memory device from a central processing unit, the data value having at least two bytes of data wherein one byte of the at least two bytes is a most significant byte of the data value and a second byte in the at least two bytes is a least significant byte of the data value, the method comprising the steps of:
providing an address value wherein the address value indicates a beginning memory location where the data value is to be stored in the memory device, the address value containing a selection bit which is not used to indicate a beginning memory location where the data value is to be stored;
providing the selection bit of the address value to a switching device wherein the switching device receives the at least two bytes of data from the central processing unit and uses the selection bit of the address value to reorder the bits through the switching device to compensate for both two different data-ordering formats;
providing at least one size value to the switching device along with the selection bit of the address value to enable proper byte reordering for different-sized data values;
ordering the at least two bytes of data through the switching device in a little-endian manner in response to a first state of the selection bit and the at least one size value; and
ordering the at least two bytes of data through the switching device in a big-endian manner in response to a second state of the selection bit and the at least one size value.

38. The method of claim 37 wherein the switching device has a first input, a second input, a third input, a fourth input, a first output a second output, a third output, and a fourth output wherein each input and each output of the switching device comprises eight bit lines to conduct a byte of data, the first output being least significant data bits and the fourth output being most significant data bits.

39. The method of claim 38 wherein the switching device allows for the writing of a byte of data from the central processing unit to the memory device wherein the byte of data is provided to the first input and is shifted any one of the first, second, third, or fourth outputs for providing the byte of data to the memory device on a proper output.

40. The method of claim 38 wherein the switching device allows for the writing of a halfword of data from the central processing unit to the memory device wherein the halfword of data is provided to the first input and the second input where the switching device connects the first input to the first output and the second input to the second output when the halfword is in a big-endian format.

41. The method of claim 38 wherein the switching device allows for the writing of a halfword of data from the central processing unit to the memory device wherein the halfword of data is provided to the first input and the second input where the switching device connects the first input to the third output and the second input to the fourth output when the halfword is in a big-endian format.

42. The method of claim 38 wherein the switching device allows for the writing of a halfword of data from the central processing unit to the memory device wherein the halfword of data is provided to the first input and the second input where the switching device connects the first input to the second output and the second input to the first output when the halfword is in a little-endian format.

43. The method of claim 38 wherein the switching device allows for the reading of a halfword of data from the central processing unit to the memory device wherein the halfword of data is provided to the first input and the second input where the switching device connects the first input to the fourth output and the second input to the third output when the halfword is in a little-endian format.

44. The method of claim 38 wherein the switching device allows for the writing of a 32-bit word of data from the central processing unit to the memory device wherein the 32-bit word of data is provided to the first through fourth inputs where the switching device connects the first input to the fourth output, the second input to the third output, the third input to the second output, and the fourth input to the first output when the 32-bit word of data is in a little-endian format.

45. The method of claim 38 wherein the switching device allows for the writing of a 32-bit word of data from the central processing unit to the memory wherein the 32-bit word of data is provided to the first through fourth inputs where the switching device connects the fourth input to the fourth output, the third input to the third output, the second input to the second output, and the first input to the first output when the 32-bit word of data is in a big-endian format.

* * * * *